United States Patent [19]
Wakeen

[11] 3,841,066
[45] Oct. 15, 1974

[54] GAS CLEANING APPARATUS
[75] Inventor: Nicholas P. Wakeen, Holden, Mass.
[73] Assignee: Norman S. Blodgett, Worcester, Mass. ; a part interest
[22] Filed: Aug. 13, 1973
[21] Appl. No.: 388,040

Related U.S. Application Data
[63] Continuation of Ser. No. 150,450, June 7, 1971, abandoned.

[52] U.S. Cl............................ 55/290, 55/351, 55/522
[51] Int. Cl............................................ B01d 46/04
[58] Field of Search ............ 55/277, 283, 288, 290, 55/301, 351, 379, 428, 522; 209/133, 142, 210

[56] References Cited
UNITED STATES PATENTS
| | | | |
|---|---|---|---|
| 251,120 | 12/1881 | Kirk | 55/285 |
| 2,805,731 | 9/1957 | Kron | 55/341 X |
| 3,000,507 | 9/1961 | Young | 55/351 X |
| 3,002,585 | 10/1961 | Pasturczak | 55/290 X |

FOREIGN PATENTS OR APPLICATIONS
| | | | |
|---|---|---|---|
| 751,876 | 7/1956 | Great Britain | 55/351 |
| 636,327 | 3/1962 | Italy | 209/210 |

Primary Examiner—Frank W. Lutter
Assistant Examiner—William Cuchlinski, Jr.
Attorney, Agent, or Firm—Norman S. Blodgett; Gerry A. Blodgett

[57] ABSTRACT

Gas-solids separator includes a housing, a drum with a foraminous wall mounted for rotation within the housing, a baffle within the drum to block off part of the foraminous wall, a partition with an edge located proximate the drum and baffle and cooperating with the baffle to remove solid particles from the outer surface of the foraminous wall.

2 Claims, 5 Drawing Figures

3,841,066

GAS CLEANING APPARATUS

This is a continuation, of application Ser. No. 150,450 filed June 7, 1971 now abandoned.

BACKGROUND OF THE INVENTION

In the art of separating dust from gas, there are many problems that exist because of the nature of the materials being dealt with. This is true not only of the separation of particulate solids from gases, but also the separation of liquid particles from gases and solid particles from liquids. In the case, for instance, of flue gas, the gas is a hot mixture of carbon monoxide, carbon dioxide, water vapor, and air mixed with a very fine dust particle. Not only does the high temperature of the gas affect the apparatus which is used for separation, but the fineness of the dust presents a major problem in separation. For instance, centrifugal separators are capable of working at high temperature, but they cannot remove fine particles. At the same time, the so-called "bag filters" separate fine dust out for a short while but, eventually, become clogged and must be replaced. Replacement of a filter bag in a high temperature gas atmosphere is a difficult task and sometimes requires the interruption of the flow of gas. What has been long desired is a continuously-operating process which will remove fine dust particles from a high temperature gas and which does not require the removal of filter elements. These and other difficulties experienced with the prior art devices have been obviated in a novel manner by the present invention.

It is, therefore, an outstanding object of the invention to provide a gas cleaning apparatus which is capable of operating with high or low temperature gases.

Another object of this invention is the provision of a gas cleaning apparatus which is capable of operating continuously without the necessity of replacing filter elements or the like.

A further object of the present invention is the provision of a gas separating apparatus capable of completely removing fine dust particles from a gas stream.

It is another object of the instant invention to provide a gas cleaning apparatus which is simple in construction, inexpensive to manufacture, and which is capable of a long life of useful service with a minimum of maintenance.

With these and other objects in view, as will be apparent to those skilled in the art, the invention resides in the combination of parts set forth in the specification and covered by the claims appended hereto.

SUMMARY OF THE INVENTION

In general, this invention has to do with the principle of providing a suction on the interior of a rotating cylindrical filter, so that the gas particles are deposited on the outside of the filter and are removed in the area of a suction-shielding baffle. The baffle is a curved segment which prevents the suction from acting on a part of the filter, so that the material falls off. A dividing plate assists this action by separating two halves of the plenum chamber to direct the flow of air and dust around the cylindrical filter. In the area of the baffle, the centrifugal force of the rotating cylinder causes the dust to be thrown off the filter, whereas, in other parts of the filter, it is caused to cling to the filter by the suction acting on the inside.

BRIEF DESCRIPTION OF THE DRAWINGS

The character of the invention, however, may be best understood by reference to one of its structural forms, as illustrated by the accompanying drawings, in which.

DESCRIPTION OF THE PREFERRED EMBODIMENT

Figure 1:
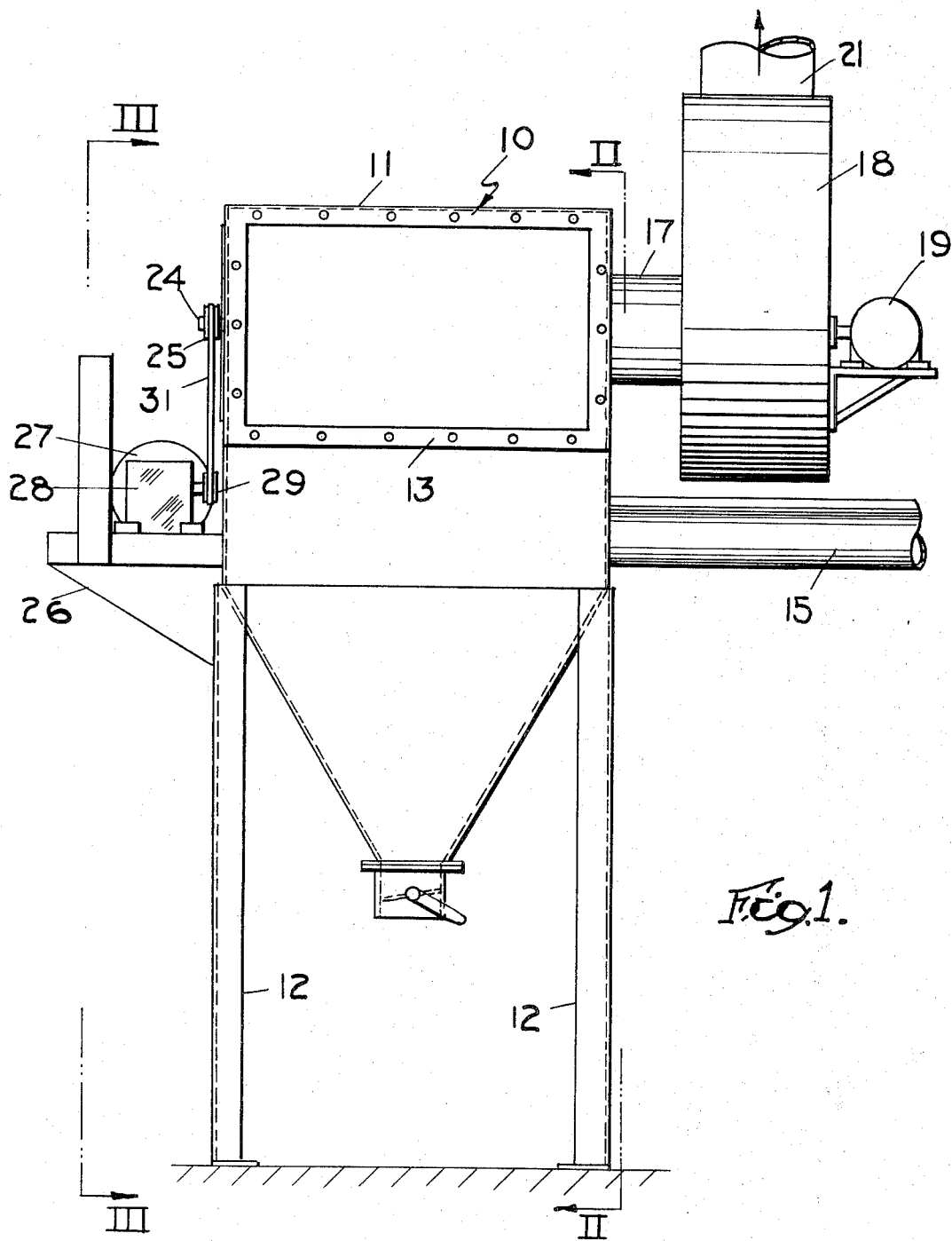
FIG. 1 is a front view of a gas separating apparatus embodying the principles of the present invention.
Figure 2:
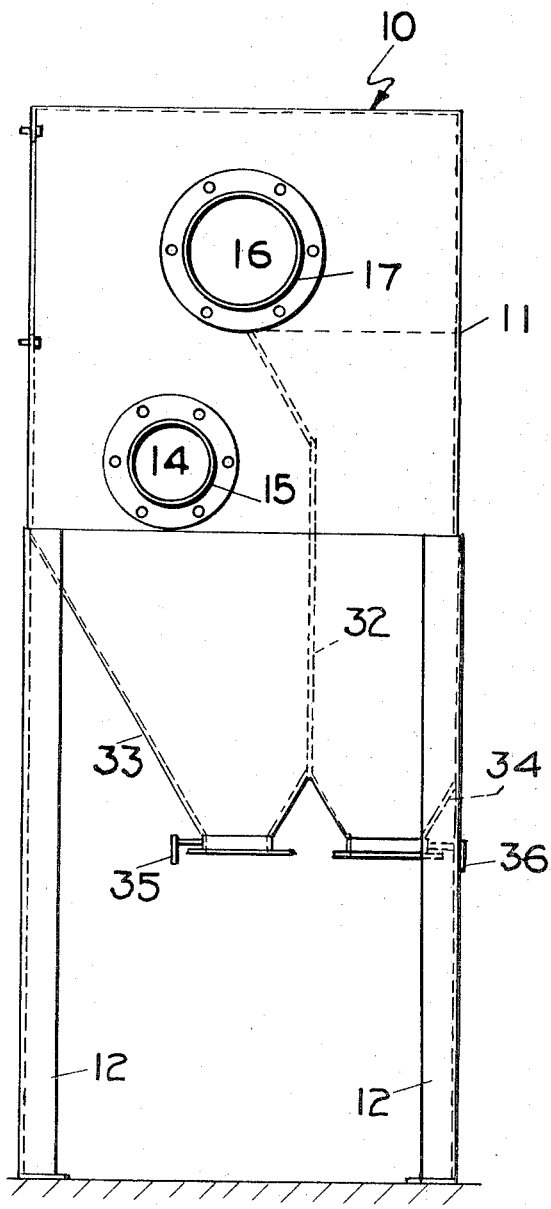
FIG. 2 is a side view of the apparatus taken on the line II—II of FIG. 1.
Figure 3:
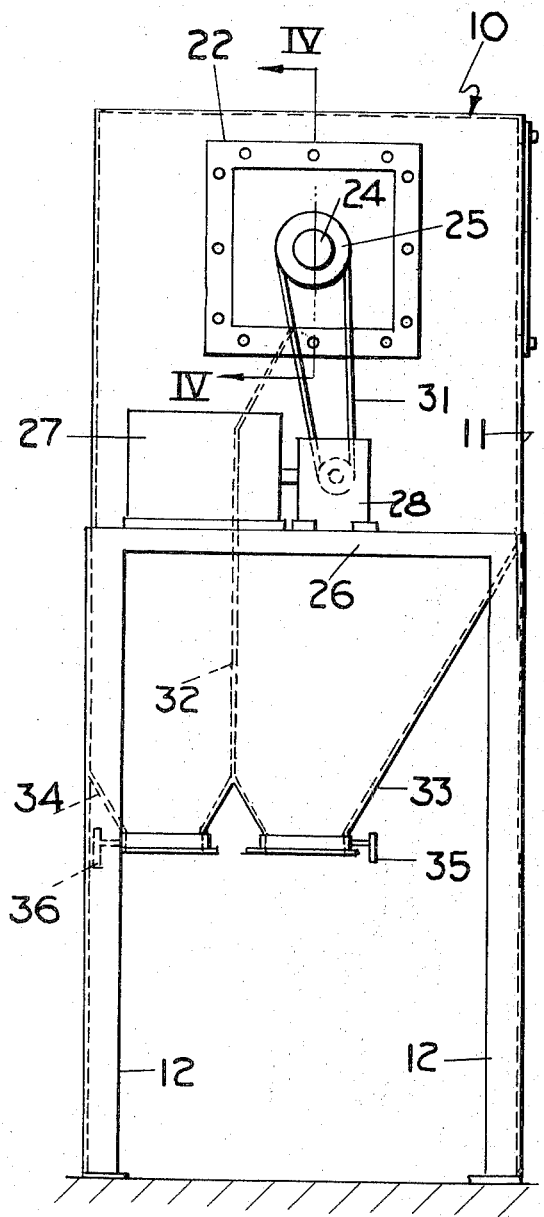
FIG. 3 is a side view of the apparatus taken on the line III—III of FIG. 1.

Referring first to FIGS. 1, 2, and 3, wherein are best shown the general features of the invention, the gas cleaning apparatus, indicated generally by the reference numeral 10, is shown as having a housing 11 constructed of sheet steel and mounted on vertical legs 12. On the front of the housing is provided an access door 13. On one side is located an inlet 14 to which is attached a pipe 15 carrying a flow of gas with fine solid particles in suspension. On the same side is located an exit 16 to which is attached a conduit 17 leading to the inlet of a centrifugal fan 18 which is driven by a motor 19. The exit of the fan is connected to a stack 21.

The other side of the housing 11 is provided with a plate 22 which carries a bearing 23 (see FIG. 4) in which is rotatably carried a shaft 24 to which is keyed a pulley 25. On the same side of the housing is mounted a platform 26 carrying a motor 27 which drives a gear box 28. The output shaft of the gear box is keyed to a pulley 29 which is drivingly connected to the pulley 25 by a flexible belt 31.

The lower part of the housing is formed as a hopper which is divided by a wall 32 into a first part 33 and a second part 34. The bottom of the first part 33 is provided with a butterfly valve having an operating handle 35, while the second part 34 is provided with a similar butterfly valve having an operating handle 36. Each butterfly valve is provided in the usual way with a suitable flapper element and a rubber lining.

Figure 4:
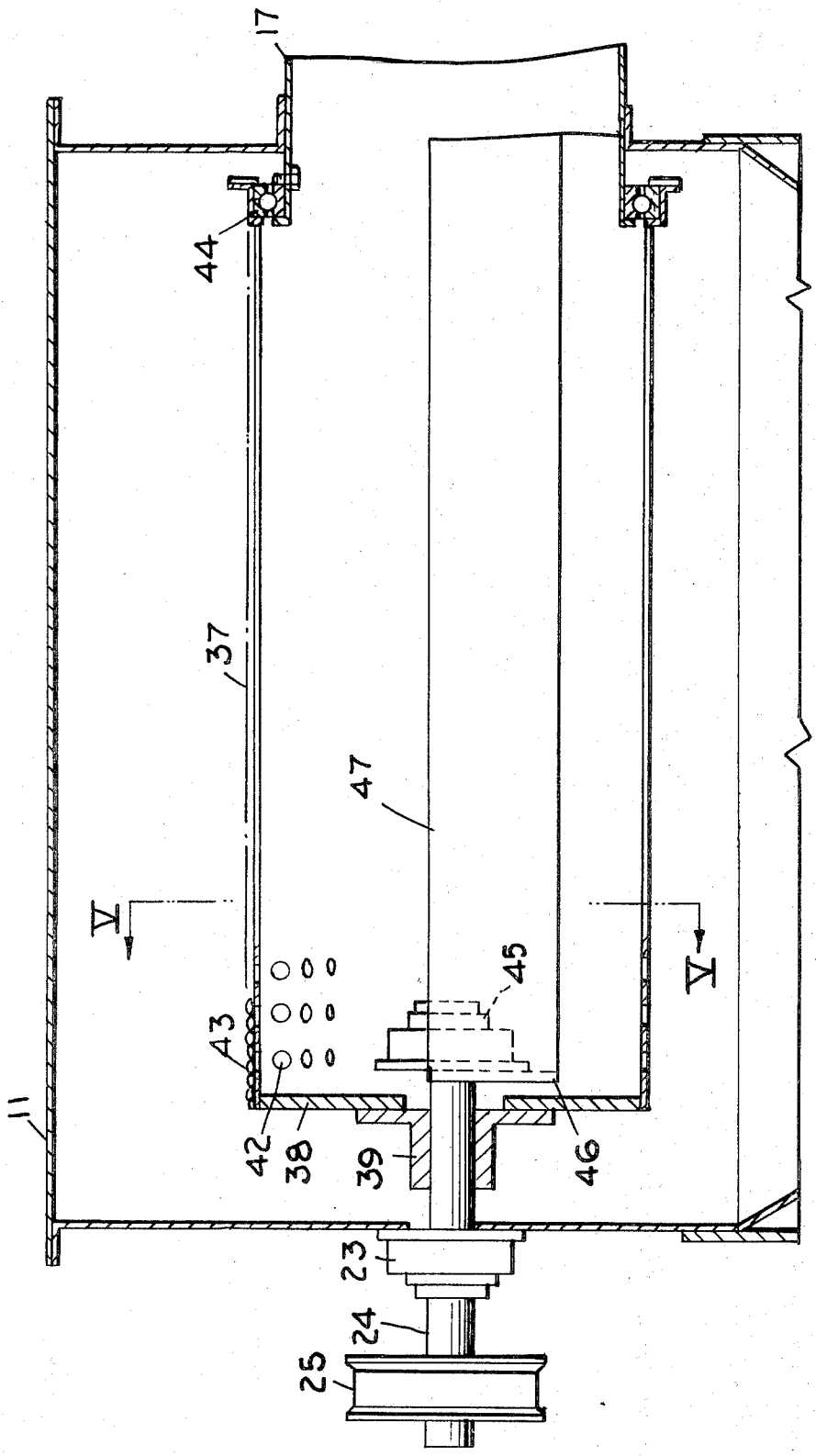
FIG. 4 is a sectional view of a portion of the apparatus taken on the line IV—IV of FIG. 3.
Figure 5:
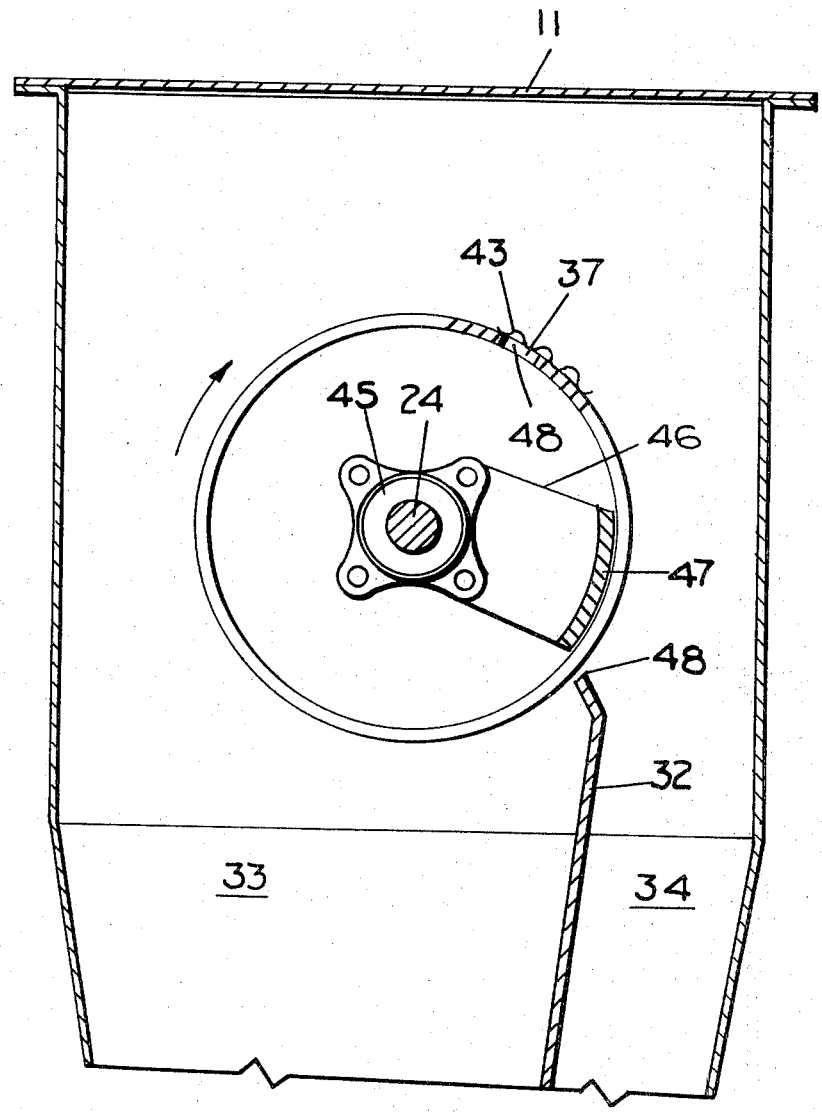
FIG. 5 is a sectional view taken on the line V-V of FIG. 4.

Referring now to FIGS. 4 and 5, it can be seen that the shaft 24 is rotatably carried in the housing 11 in the bearing 23 and extends from one end of a drum 37 having an end plate 38 carrying a hub 39 which is keyed to the rotatable shaft 24. The drum is provided with an inner metal sleeve 41 which is formed with large perforations or holes 42. Extending around the outside of this sleeve is a porous sleeve 43 formed of a heat-resistant material which, because of its woven nature, has a large number of relatively small holes or foramena.

At the other end, the sleeve 41 is provided with a large roller bearing 44 by which it is rotatably mounted on the duct or conduit 17 which extends into the housing 11 a short distance. Rotatably mounted on the inner end of the shaft 24 is a hub 45 to which is fastened a pie-shaped bracket 46 which holds a baffle 47. The baffle is provided with an outer cylindrical surface which is concentric to the axis of the sleeve 41 and the shaft 24; it has the same radius as the inner surface of the sleeve 41 to which it lies closely adjacent. The baffle is arranged so that it does not rotate with the drum 37 and subtends an angle of about 30° on its inner surface, thus covering up the large holes 42 and, of course, the foramena in the porous sleeve 43. The other end of the baffle 47 is suitably formed to lie on the surface of the conduit 17, so that this resists any tendency for the baffle to move with the shaft 24 as it rotates. Extending away from the drum 37 is the wall 32 which, as can be seen in FIG. 5, has a short radial portion 48 whose free edge lies close to the outer surface of the fabric sleeve 43 and which merges into a vertical wall portion 49 which divides the lower part of the housing into the first part 33 and the second part 34.

The operation of the apparatus will now be readily understood in view of the above description. The mixture of dust and fine particles of solid material in suspension enters the apparatus through the pipe 15 and flows into the first part 33 of the hopper-like portion of the housing. The operation of the fan 18 (driven by its motor 19) causes a flow of gas through the housing from the exterior of the drum 37 to the interior and out one end through the duct or conduit 17, through the fan 18, and up the stack 21. Passage of the gas through the fabric 43 and through the apertures 42 in the inner shell 41 causes the dust particles to be left on the exterior surface of the drum. The drum is rotated by its motor 27 and the gear box 28 in the direction shown by the arrow in FIG. 5, so that the dust particles are carried in a clockwise direction around with the drum, as indicated in FIG. 5. Eventually, a given area of the drum reaches the vicinity of the baffle 47 and, for a short time, that area is blocked off from the suction in the interior of the drum due to the fan 18. Since the drum is going at a high rate of speed, centrifugal force throws the dust particles off the outside surface of the fabric 43 and they fall down the chute formed by the wall 32 and the housing in the second part 34. The fact that the edge of the portion 48 of the wall 32 lies closely adjacent the surface of the drum means that any accumulation of dust will also be knocked off and fall in the same general direction. When the second part 34 of the housing is full of dust particles, it is possible to remove the accumulation by operating the valve handle 34.

It can be seen, therefore, that the porous sleeve 43 is self-cleaning in that particles are being continuously removed from its outside surface. Large solid particles which appear at the pipe 15 and are introduced through the inlet opening 14 may fall downwardly into the first portion 33 of the housing hopper and be removed eventually (after a certain accumulation) by the operation of the handle 35 and the valve operated thereby. The fabric can be either an asbestos fabric or a glass fibre fabric, both of which are not subject to corrosion or to burning due to the presence of hot gas. It can be seen that the apparatus is very simple in construction, so that it is easy to maintain to prevent destruction due to corrosive materials being handled.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. A gas cleaning apparatus, comprising:
   a. a chamber,
   b. a hollow drum mounted in the chamber for rotation about its axis, the drum being provided with a foraminous wall,
   c. means for introducing gas with fine solid particles in suspension into a first section of the chamber located within the lower portion of the chamber externally of the drum,
   d. means for removing gas from the interior of the drum,
   e. a baffle located within the drum to block off the foramina in a substantial area of the drum,
   f. a foraminous coating which covers the exterior of the foraminous wall, the coating having foramina of relatively smaller size than those of the wall, and
   g. a partition having an edge, the partition separating the first section of the chamber from a second section of the chamber which lies outside of the drum, in the lower portion of the chamber and adjacent the baffle, and the edge being parallel to the axis of the drum and adjacent to both the wall and the baffle, the edge being spaced from the wall a distance sufficient to remove extraneous accumulated solid particles from the outer surface of the wall.

2. A gas cleaning apparatus as recited in claim 1, wherein the coating is a high-temperature resistant fabric.

* * * * *